US010332840B2

(12) United States Patent
Tseng et al.

(10) Patent No.: US 10,332,840 B2
(45) Date of Patent: Jun. 25, 2019

(54) SEMICONDUCTOR DEVICE WITH PHYSICALLY UNCLONABLE FUNCTION (PUF) AND APPARATUS INCLUDING THE SAME (71) Applicant: MACRONIX INTERNATIONAL CO., LTD., Hsinchu (TW)

(72) Inventors: Po-Hao Tseng, Taichung (TW); Kai-Chieh Hsu, Taoyuan (TW)

(73) Assignee: MACRONIX INTERNATIONAL CO., LTD., Hsinchu (TW)

(*) Notice: Subject to any disclaimer, the term of this patent is extended or adjusted under 35 U.S.C. 154(b) by 0 days.

(21) Appl. No.: 15/464,377

(22) Filed: Mar. 21, 2017

(65) Prior Publication Data
US 2018/0277198 A1    Sep. 27, 2018

(51) Int. Cl.
| H01L 27/112 | (2006.01) |
| H01L 23/535 | (2006.01) |
| H01L 23/00 | (2006.01) |
| G11C 7/10 | (2006.01) |
| G11C 7/24 | (2006.01) |
| G11C 17/16 | (2006.01) |

(52) U.S. Cl.
CPC .......... *H01L 23/535* (2013.01); *G11C 7/1006* (2013.01); *G11C 7/24* (2013.01); *G11C 17/16* (2013.01); *H01L 23/57* (2013.01); *H01L 27/11226* (2013.01)

(58) Field of Classification Search
CPC ... G11C 11/419; G11C 11/412; G11C 11/413; H01L 23/535; H01L 23/57; H01L 27/1108; H01L 27/11; H01L 27/1104
See application file for complete search history.

(56) References Cited

U.S. PATENT DOCUMENTS

| 6,528,411 | B2 * | 3/2003 | Kakuhara | H01L 21/32051 |
| | | | | 257/750 |
| 7,312,109 | B2 * | 12/2007 | Madurawe | H01L 21/8221 |
| | | | | 438/138 |
| 7,586,130 | B2 | 9/2009 | Kawashima et al. | |
| 8,896,026 | B2 | 11/2014 | Jeon et al. | |
| 9,142,636 | B2 | 9/2015 | Sheppard et al. | |
| 9,391,030 | B1 | 7/2016 | Li et al. | |

(Continued)

OTHER PUBLICATIONS

Holcomb, et al.: "Power-Up SRAM State as an Identifying Fingerprint and Source of True Random Numbers"; IEEE Transactions on Computers, vol. 58, No. 9, Sep. 2009; pp. 1198-1210.

(Continued)

*Primary Examiner* — Harry W Byrne
*Assistant Examiner* — Sultana Begum
(74) *Attorney, Agent, or Firm* — McClure, Qualey & Rodack, LLP (57) ABSTRACT A semiconductor device includes a programmable memory array comprising plural memory units disposed above a substrate. One of the memory units comprises a gate electrode disposed above the substrate, a conductive portion spaced apart from the gate electrode, and a dielectric layer contacting the conductive portion and separated from the gate electrode, and the dielectric layer defining a threshold voltage of the related memory unit, wherein at least two of the memory units have different threshold voltages.

16 Claims, 8 Drawing Sheets

(56) References Cited

U.S. PATENT DOCUMENTS

| | | | |
|---|---|---|---|
| 9,905,665 B2* | 2/2018 | Ando | H01L 29/517 |
| 2003/0232136 A1* | 12/2003 | Fukuda | C23C 16/453 |
| | | | 427/248.1 |
| 2008/0123430 A1 | 5/2008 | Yen | |
| 2013/0325372 A1* | 12/2013 | Watanabe | H01L 23/576 |
| | | | 702/58 |
| 2014/0070364 A1* | 3/2014 | Park | H01L 23/5252 |
| | | | 257/530 |
| 2014/0264588 A1 | 9/2014 | Chen et al. | |
| 2016/0020294 A1* | 1/2016 | Koo | H01L 29/511 |
| | | | 257/288 |
| 2016/0087805 A1* | 3/2016 | Li | H04L 9/0866 |
| | | | 713/193 |
| 2016/0156476 A1 | 6/2016 | Lee et al. | |

OTHER PUBLICATIONS

Shen, et al.: "Highly Reliable Anti-Fuse Technology in sub-16nm Technologies for Security Applications"; 2016 International Conference on IC Design and Technology; pp. 1-4.
TIPO Office Action dated Dec. 180, 2018 in Taiwan application (No. 106105194).

* cited by examiner

SEMICONDUCTOR DEVICE WITH PHYSICALLY UNCLONABLE FUNCTION (PUF) AND APPARATUS INCLUDING THE SAME

BACKGROUND

Field of the Invention

The disclosure relates in general to a semiconductor device and an apparatus including the same, more particularly to a semiconductor device with physically unclonable function (PUF) and an apparatus including the same.

Description of the Related Art

Physical unclonable function (PUF) is a solution to generate chip "fingerprints" as a hardware intrinsic security (HIS) technology. PUF application prevents physical attack attempting to extract digital information from a chip. SRAM is one of most popular device to implement PUF application, which uses the threshold voltage variation to generate chip ID during the power-up state. However, the SRAM PUF (ex: with six transistors) has large cell size, which is a concern for minimization of PUF array. Also, the SRAM PUF is susceptible to the environmental noise. For example, the SRAM PUF is quite sensitive to the noises generated by temperature and voltage level variations (such as the supply voltage VDD). The hamming distances of the SRAM PUF is increased with the temperature, which indicated that the bit error rate (BER) is also increased. Accordingly, although the SRAM PUF can provide randomness and uniqueness for the PUF application, but the reliability is one of the major concerns due to the noise induced instability.

SUMMARY

The disclosure relates to a semiconductor device and an apparatus including the same, for achieving high stability of the programmable memory array and improving reliability of the apparatus including the PUF device. The programmable memory array of the embodiment can be applied to a semiconductor device with physically unclonable function (PUF) and an apparatus including the same.

According to an embodiment, a semiconductor device is provided, comprising a programmable memory array comprising plural memory units disposed above a substrate. One of the memory units comprises a gate electrode disposed above the substrate; a conductive portion spaced apart from the gate electrode; and a dielectric layer contacting the conductive portion and separated from the gate electrode, and the dielectric layer defining a threshold voltage of the memory unit, wherein at least two of the memory units have different threshold voltages.

According to another embodiment, an apparatus with a semiconductor device is provided, comprising a substrate having a sub-function region and a main function region; a main function memory array disposed in the main function region; and a programmable memory array disposed in the sub-function region and comprising plural memory units, and each of the memory units comprising: a gate electrode disposed above the substrate; a conductive portion (such as one of the conductive plugs or vias) spaced apart from the gate electrode; and a dielectric layer contacting the conductive portion (such as disposed above or under the conductive portion), and the dielectric layer defining a threshold voltage of the memory unit, wherein at least two of the memory units have different threshold voltages. When a pre-determined voltage is applied to source or drain of the memory units, a part of the memory units are turned on while other(rest) part of the memory units are turned off.

According to a further embodiment, an apparatus with a semiconductor device is provided, comprising: a mission function circuit disposed on a substrate; an access control unit coupled to the mission function circuit; a programmable memory array comprising plural memory units as described above, and the programmable memory array disposed on the substrate and capable of creating one or more data sets after a programming procedure; a security logic unit disposed on the substrate and coupled to the access control unit, wherein the security logic unit is also coupled to the programmed memory array, and the security logic unit stores one unique data set from the one or more data sets after execution of the programming procedure; and a program controller disposed on the substrate and coupled to the programmed memory array and the security logic unit, wherein the unique data set is utilized by the security logic unit in communications with the access control unit.

The disclosure will become apparent from the following detailed description of the preferred but non-limiting embodiments. The following description is made with reference to the accompanying drawings.

DETAILED DESCRIPTION

In the embodiments of the present disclosure, a semiconductor device comprising a programmable memory array such as a physically unclonable function (PUF) programmable memory array is provided. The PUF reliability can be significantly enhanced by using the embodied PUF programmable memory array. Several embodiments are provided hereinafter with reference to the accompanying drawings for describing the related procedures and configurations. Related structural details such as layers and spatial arrangement and one of practical applications for applying the embodied PUF-programmable memory array on a chip are further described in the embodiments. However, the present disclosure is not limited thereto. It is noted that not all embodiments of the invention and the applications are shown. The identical and/or similar elements of the embodiments are designated with the same and/or similar reference numerals. Also, it is noted that there may be other embodiments of the present disclosure which are not specifically illustrated. Modifications and variations can be made without departing from the spirit of the disclosure to meet the requirements of the practical applications. It is also important to point out that the illustrations may not be necessarily be drawn to scale. Thus, the specification and the drawings are to be regard as an illustrative sense rather than a restrictive sense.

Moreover, use of ordinal terms such as "first", "second", etc., in the specification and claims to describe an element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1A:
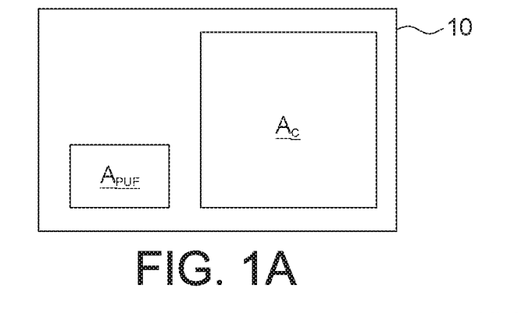
FIG. 1A is a simple drawing of an apparatus with semiconductor device according to the embodiment of the present disclosure.

FIG. 1A is a simple drawing of an apparatus with semiconductor device according to the embodiment of the present disclosure. According to the embodiment, an apparatus with semiconductor device is disclosed, comprising a substrate 10 having a main function region $A_C$ and a sub-function region such as a PUF region $A_{PUF}$. In one embodiment, a programmable memory array such as a PUF programmable memory array is disposed in the PUF region $A_{PUF}$, while a main function circuit (i.e. mission function circuits) is disposed in the main function region $A_C$. In one embodiment, the programmable memory array comprises plural memory units such as PUF resistance memory cells with PUF transistors (ex: PUF-MOSFET(1T)). According to the embodiment, the memory unit comprises at least a dielectric layer disposed on the source (S) or the drain (D) of the transistor. Alternatively, the dielectric layer can be disposed on the contact plug connected to the source (S)/drain (D). Alternatively, the dielectric layer can be disposed on the via electrically connected to the transistor. The resistance of the dielectric layer is not reversible. When a pre-determined voltage is applied to source or drain of the memory units, a part of the memory units are turned on, and the rests of the memory units are turned off, wherein the dielectric layers of the turned-on memory units are in a breakdown condition while the dielectric layers of the turned-off memory units are in an non-breakdown condition.

Figure 1B:
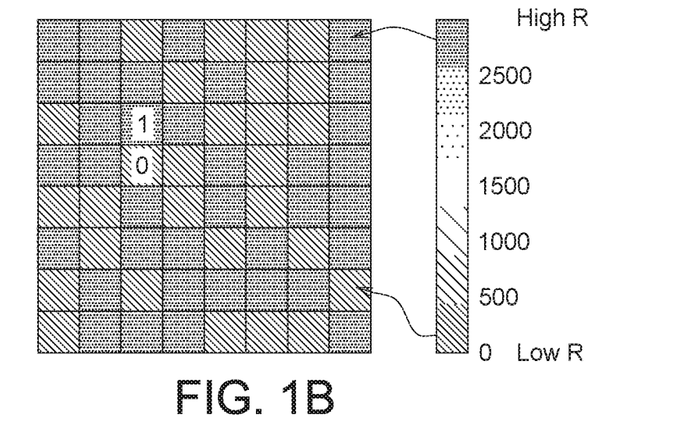
FIG. 1B depicts one bit-mapping condition of an applicable programmable memory array with 8×8 PUF memory cells according to the embodiment.

FIG. 1B depicts one bit-mapping condition of an applicable programmable memory array with 8×8 PUF memory cells according to the embodiment. In one embodiment, if the dielectric layer disposed over S/D or in the current path is not broken-down by applying a predetermined voltage on S/D, the current between S/D would be very small (i.e. no current or a few current), and the resistance between S/D would be extremely high consequently, wherein these memory units comprising non-breakdown dielectric layers are so called as turned-off memory units, and the transistors of the turned-off memory units are also turned off. If the dielectric layer over S/D is broken-down by applying a predetermined voltage on S/D, the current between S/D would be high (ex: like a normal transistor), and the resistance between S/D would be low consequently, wherein these memory units comprising breakdown dielectric layers are so called as turned-on memory units, and the transistors of the turned-on memory units are also turned on. According to one embodiment, the memory units with the turn-on transistors provide the digital signal "0", and the memory units with the turn-off transistors provide the digital signal "1", and a combination of those induced random digital signals in a array during the power-up state (as exemplified by one of combinations shown in FIG. 1B) creates a particular chip "fingerprint" for practical application. Also, according to the embodiment, a pre-determined voltage is applied to all of the memory units simultaneously to achieve a combination of turned-on transistors and turned-off transistors, which means that it only requires one-time programming procedure for the memory units (i.e. it is no need to breakdown the memory units one by one). This one-time programming procedure is also referred as a "meta-breakdown" procedure in the present embodiment.

Figure 1C:
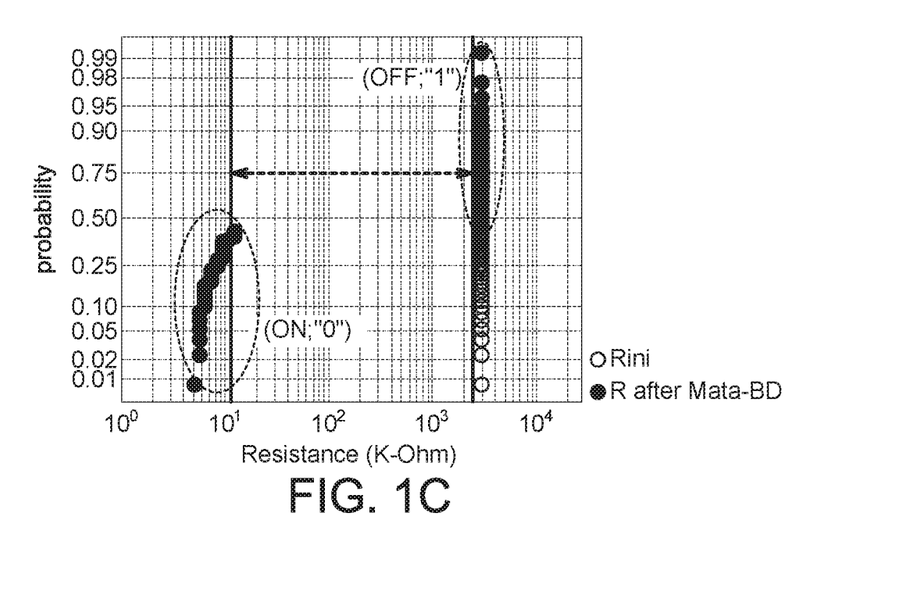
FIG. 1C shows a resistance distribution of the turned-on and turned-off memory units according to one embodiment of the disclosure.

Additionally, when the pre-determined voltage is applied to the memory units to perform a "meta-breakdown" procedure of the embodiment, the turned-on transistors of the memory units have low resistances such as less than 10 k ohms (k$\Omega$), and the turned-off transistors of the memory units have high resistances such as larger than 100 megohms (M$\Omega$). FIG. 1C shows a resistance distribution of the turned-on and turned-off memory units according to one embodiment of the disclosure. In the initial state (before meta-breakdown), the dielectric layers of the embodiment in all of the memory units are in an non-breakdown condition, so that all of the memory units have high resistances, as shown in the right portion of FIG. 1C. After the meta-breakdown procedure is performed (i.e. a pre-determined voltage is applied to the memory units for breaking the dielectric layers of some memory units), the turned-on memory units have low resistances less than 10 k ohms (k$\Omega$) as shown in the left dashed circle of FIG. 1C, and the turned-off memory units have high resistances as shown in the right dashed circle of FIG. 1C. It is noted that the resistances of the initial memory units and the turned-off memory units as indicated in FIG. 1C (i.e. about 3000 k$\Omega$) are the maximum resistance values of the test machine (machine limitation), and the actual resistance values of the initial memory units and the turned-off memory units would be much higher than 3000 k$\Omega$; for example, larger than 100 megohms (M$\Omega$) such as 100M$\Omega$ to 10 gigaohms (G$\Omega$), or more.

According to the PUF design of the embodiment, the PUF reliability can be enhanced by using the memory units having embodied transistors (ex: MOSFET(1T)-PUF) due to the existence of plentiful resistance margin between the digital signals "0" and "1" (i.e. huge difference between the resistances of the turned-on and turned-off transistors of the memory units).

Figure 2A:
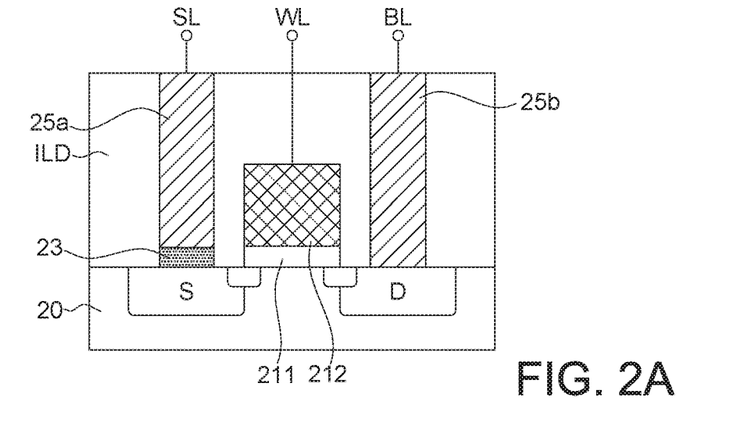
FIG. 2A is a cross-sectional view simply showing a memory unit according to the first embodiment of the present disclosure.

According to a PUF programmable memory array of the embodiment, the dielectric layer of the memory unit can be disposed on the source (S) or/and the drain (D) of the transistor. Applicable types of the transistor examples in the embodiments include, but not limited to, MOSFET (with different generation), FinFET, TFET, Multi-Gate MOSFET, GAA-FET, Ge-FET, SiGe-FET, SOI-MOSFET, Strained-Si MOSFET and so on. FIG. 2A is a cross-sectional view simply showing a memory unit according to the first embodiment of the present disclosure. A memory unit includes a gate insulating layer 211 disposed on a substrate 20, a gate electrode 212 disposed on the gate insulating layer 211, a source S and a drain D formed in the substrate 20, a dielectric layer 23, and a first contact plug 25a and a second contact plug 25b respectively disposed on the source S and the drain D, wherein the source S and the drain D are disposed correspondingly at two sides of the gate electrode 212. Also, an insulation such as an inter-layered dielectric layer ILD covers the gate insulating layer 211 and the gate electrode 212. During fabrication, the contact holes are formed in the ILD for disposing the dielectric layer 23 of the embodiment, and a conductive material is deposited on the ILD and fully fills the contact holes, followed by planarizing (ex: CMP) the conductive material, so as to form the first contact plug 25a/the second contact plug 25b. For the transistor, the source S and the drain D are respectively coupled to a source line SL and a bit line BL, while the gate electrode 212 is coupled to a word line WL.

According to the embodiments, a memory unit further includes at least a dielectric layer (ex: 23/24/43/44) contacting a conductive portion and separated from a gate electrode, wherein the dielectric layer defines a threshold voltage of the memory unit. The conductive portion of the memory unit could be one of the contact plugs (ex: the first contact plug 25a and the second contact plug 25b) or the vias for contacting the dielectric layer(s) of the embodiment. In the first embodiment, the dielectric layer 23 (apart from the gate electrode 212) is disposed on the source S, and the first contact plug 25a (as the conductive portion) is disposed on the dielectric layer 23 and directly contacts the dielectric layer 23. As shown in FIG. 2A, the dielectric layer 23 completely separates the first contact plug 25a from the source S by covering the exposed surface of the source S.

Figure 2B:
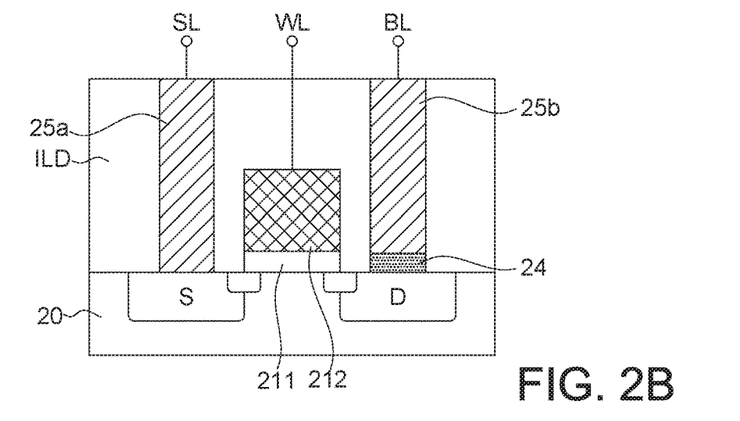
FIG. 2B is a cross-sectional view simply showing a memory unit according to the second embodiment of the present disclosure.
Figure 2C:
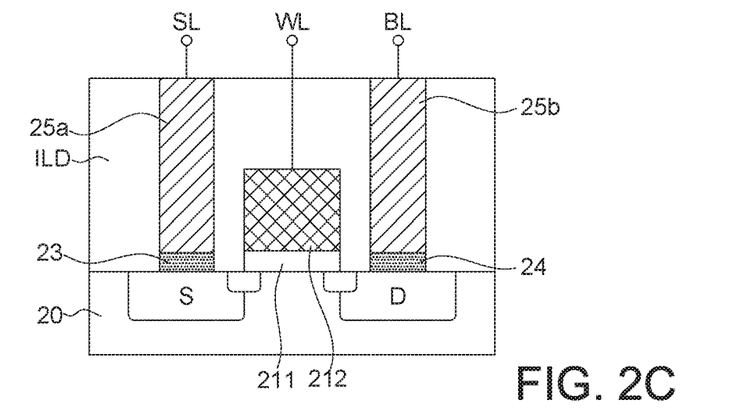
FIG. 2C is a cross-sectional view simply showing a memory unit according to the third embodiment of the present disclosure.

Alternatively, the dielectric layer of the embodiment could be disposed on the drain D, or on both of the source S and the drain D. FIG. 2B is a cross-sectional view simply showing a memory unit according to the second embodiment of the present disclosure. FIG. 2C is a cross-sectional view simply showing a memory unit according to the third embodiment of the present disclosure. It is noted that the identical and/or similar elements in the structures of FIG. 2B/FIG. 2C and FIG. 2A are designated with the same and/or similar reference numerals, and the details of the configurations and working principles of the identical components/layers are not redundantly described.

In the second embodiment, a dielectric layer 24 is disposed on the drain D (ex: by completely covering the exposed surface of the drain D), and the second contact plug 25b (as the conductive portion) is disposed on the dielectric layer 24 and directly contacts the dielectric layer 24, as shown in FIG. 2B, wherein the dielectric layer 24 completely separates the second contact plug 25b from the drain D. When a pre-determined voltage applied to the source S or the drain D of the transistor of the memory unit breaks the dielectric layer 23 (FIG. 2A) or the dielectric layer 24 (FIG. 2B) down, the memory unit would be turned on (i.e. the corresponding transistor having low resistances; and providing the digital signal "0").

In the third embodiment, a dielectric layer 23 and another dielectric layer 24 are respectively disposed on the source S and the drain D for completely separating the first contact plug 25a and the second contact plug 25b from the source S and the drain D, as shown in FIG. 2C. Similarly, when a pre-determined voltage applied to the source S or the drain D of the transistor of the memory unit breaks both of the dielectric layer 23 and the dielectric layer 24 down, the memory unit would be turned on (the transistor having low resistances; and providing the digital signal "0"). If the voltage only breaks one of the dielectric layer 23 and the dielectric layer 24, the transistor of the memory unit would still be in the turned-off condition.

Figure 3:
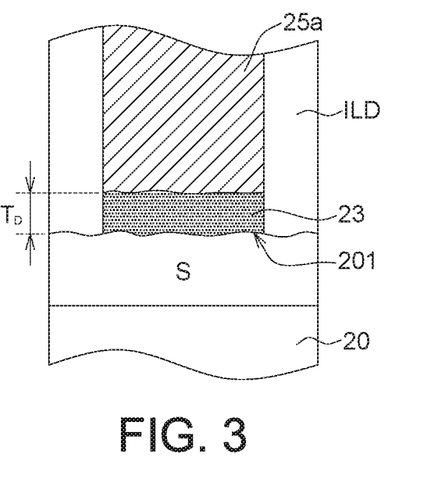
FIG. 3 shows an enlarging portion of the dielectric layer of FIG. 2A.

According to the embodiment, for the (PUF) memory units with transistors disposed in the PUF region $A_{PUF}$, at least two of the memory units have different threshold voltages (defined by the dielectric layers thereof). When a pre-determined voltage is applied to the memory units, a part of the memory units are turned on while the other part (i.e. the rests) of the memory units are turned off. During fabrication, the contact holes formed usually by dry-etching an oxide layer (i.e. ILD) leads to an uneven surface of the substrate. FIG. 3 shows an enlarging portion of the dielectric layer of FIG. 2A. As shown in FIG. 3, the dielectric layer 23 disposed on the uneven surface 201 of the substrate 20 has an uneven thickness. Due to the process variation, surface roughness of the substrate (self-formed after contact hole etching) will lead to different thicknesses of the dielectric layers in the different memory units, which may induce different breakdown voltages for the memory units. The non-uniformed dielectric layers of the embodiment can be grown by oxidation (or deposition) on the rough surface of the substrate 20.

In one embodiment, the dielectric layers of the embodied memory units have the thicknesses (ex: the thickness $T_D$ of the dielectric layer 23 in FIG. 3) in a range of 1 nm to 5 nm. If the dielectric layer is too thick (ex: $T_D>5$ nm), large breakdown voltage would be needed. If the dielectric layer is too thin (ex: $T_D<1$ nm), the initial resistance of the embodied memory units would be too low. However, the present disclosure is not limited thereto, and the thicknesses of the dielectric layers of the embodiment can be varied or modified as long as a combination of the digital signals of the memory units (as exemplified by FIG. 1B) can be created after performing the "meta-breakdown" procedure described above. Additionally, the memory units with different threshold voltages would have different thicknesses of the dielectric layers. The thicker dielectric layer requires the higher voltage for causing the breakdown condition. In other words, for the memory units with different threshold voltages, a thickness of the dielectric layer of the memory unit with a higher threshold voltage is larger than a thickness of the dielectric layer of the memory unit with a lower threshold voltage.

Also, since the process variations induce the Si surface roughness (ex: of the S/D side) and lead to the non-uniformed thickness of the dielectric layer with rough surface, several related experiments are also conducted to investigate the surface roughness of the dielectric layer. The surface roughness of the dielectric layer is measured by sampling at least 7 points in TEM picture with 10 nm scale bar. According to one embodiment, the dielectric layer has a surface roughness larger than 5% of uniformity, and the uniformity equation is expressed below:

$$[(MAX-MIN)/(2\times AVG)]\times 100\%,$$

wherein "AVG" is an average thickness of q local points sampled on the dielectric layer, "MAX" is a maximum thickness of said q local points, "MIN" is a minimum thickness of said q local points, $q \geq 7$ and q is an integer.

Additionally, material examples of the dielectric layer include, but not limited to, $SiO_x$, $SiN_x$, $SiON_x$ and other applicable materials. In one example, the dielectric layer is an oxide layer formed by a plasma treatment on the surface of the source and/or the drain. In other example, the dielectric layer may include nitride or other dielectric layer suitable for using in break-down operation (ex: meta-breakdown procedure) as mentioned above. It is noted that those material examples listed above are provided for illustration, not for limitation.

Figure 4:
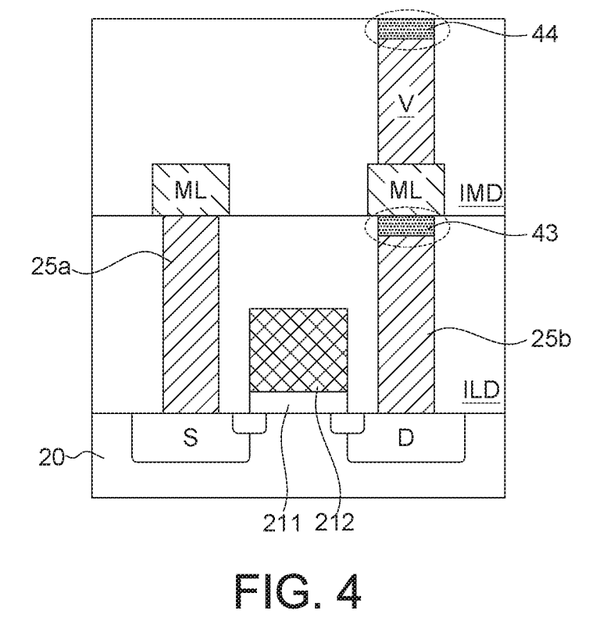
FIG. 4 is a cross-sectional view simply showing dielectric layer disposed on a conductive portion according to the fourth embodiment of the present disclosure.

Alternatively, according to another embodied programmable memory array, the dielectric layer of the (PUF) memory unit can be disposed on the contact plug or the via. FIG. 4 is a cross-sectional view simply showing dielectric layer disposed on a conductive portion according to the fourth embodiment of the present disclosure. In FIG. 4, a dielectric layer 43 can be disposed on the contact plug (such as on the second contact plug 25b), or a dielectric layer 44 can be disposed on the via V in the inter-metal dielectric layer IMD, for achieving the purpose of the embodiment. The identical and/or similar elements in the structures of FIG. 4 and FIG. 2A-FIG. 2C are designated with the same and/or similar reference numerals, and the details of the configurations and working principles have been described above, which are not redundantly repeated. Furthermore, it is noted that the configurations of FIG. 2A-FIG. 2C and FIG. 4 merely illustrate some of possible memory units and transistors, and other types of the memory units and transistors with suitable modifications can be applied in the applications.

According to the design of the embodiment, different randomness of the digital signals "0" and "1" can be achieved. Take the embodied (PUF) memory units as example; several related experiments for testing the breakdown conditions are performed. FIG. 5A-FIG. 5H show eight sets of the resistance distribution of the transistors of the turned-on and turned-off memory units according to the experiments performed on a memory array of the embodiment of the disclosure. Please also refer to FIG. 2A-FIG. 2C. In these experiments, 4.0V and 3.5V are initially applied to the word line WL and the bit line BL, respectively. Then, the BL voltage varies from 3.5V to at least 4.0V (4.0V in FIG. 5A, 4.1V in FIG. 5B, 4.3V in FIG. 5C, 4.4V in FIG. 5D, 4.5V in FIG. 5E, 4.6V in FIG. 5F, 4.7V in FIG. 5G and 4.8V in FIG. 5H) (i.e. increased by a step voltage of 0.1V; ex: 3.5V, 3.6V, 3.7V, . . . 4.0V of BL) when the WL voltage remains at 4.0V, to investigate the resistances of the transistors of the memory units after meta-breakdown procedures. Afterwards, the WL voltage is increased to 4.5V, and the BL voltage varies from 3.5V to at least 4.0V (ex: 4.0V-4.6V of FIG. 5A-FIG. 5H) as described above to investigate the resistances of the transistors of the memory units after meta-breakdown procedures. Then, the WL voltage is increased to 5.0V, and the BL voltage also varies from 3.5V to at least 4.0V (ex: 4.0V-4.6V of FIG. 5A-FIG. 5H) as described above to investigate the resistances of the transistors of the memory units after meta-breakdown procedures.

Figure 5A:
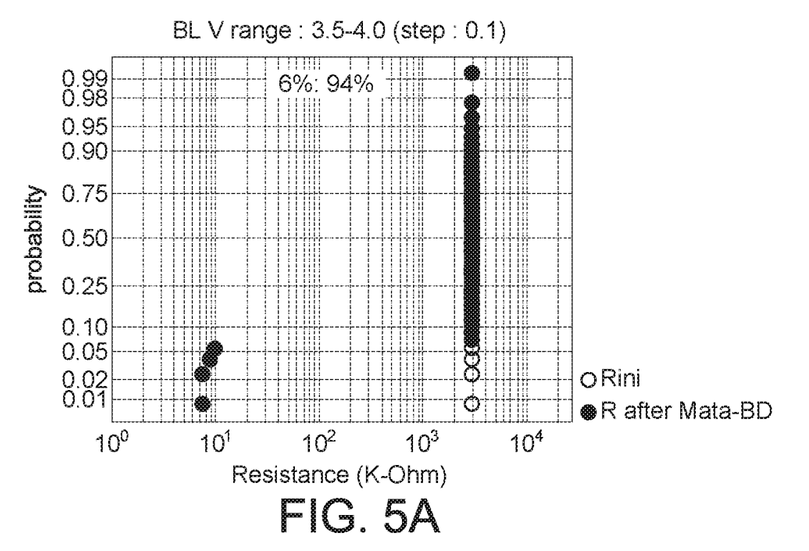
FIG. 5A-FIG. 5H show eight sets of the resistance distribution of the transistors of the turned-on and turned-off memory units according to the experiments of an embodiment of the disclosure.
Figure 5B:
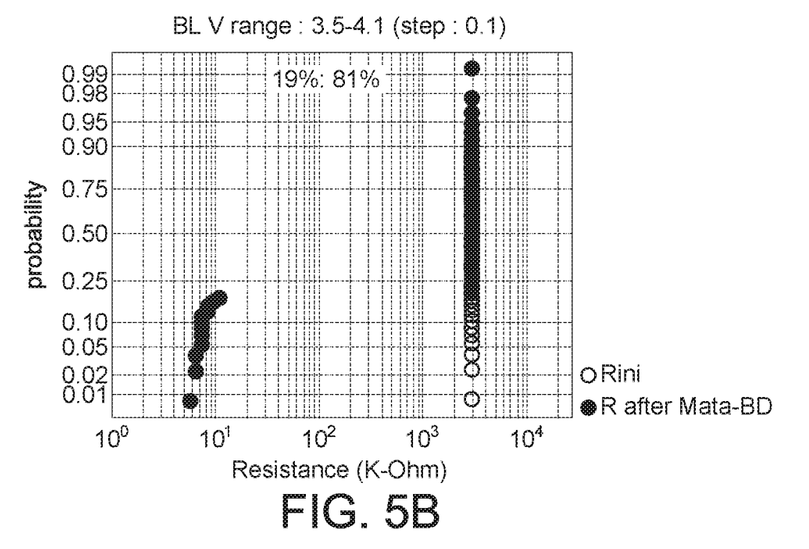
Figure 5C:
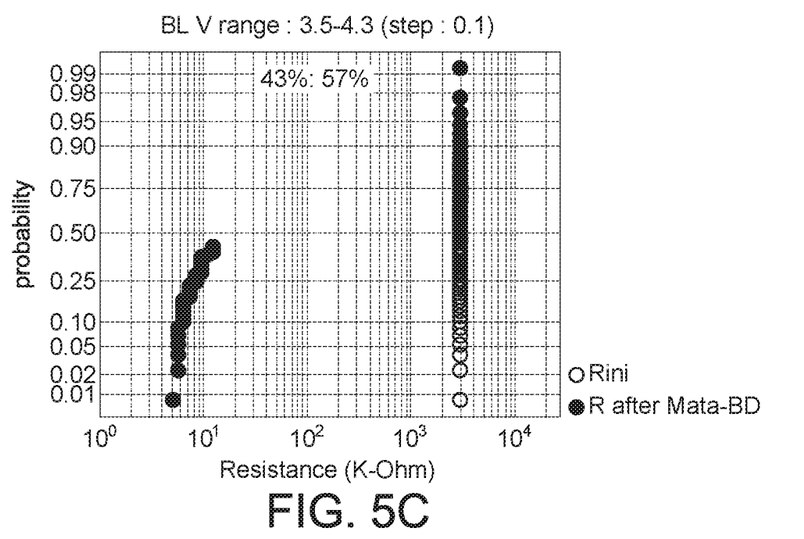
Figure 5D:
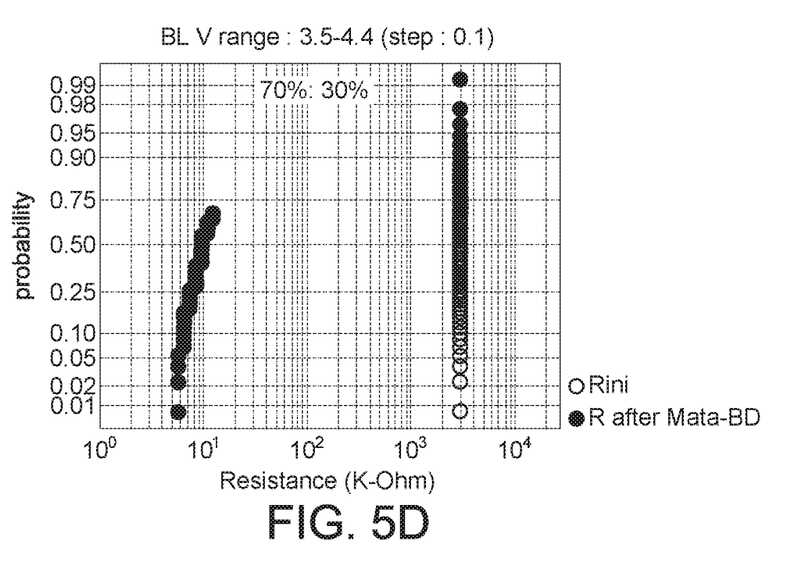
Figure 5E:
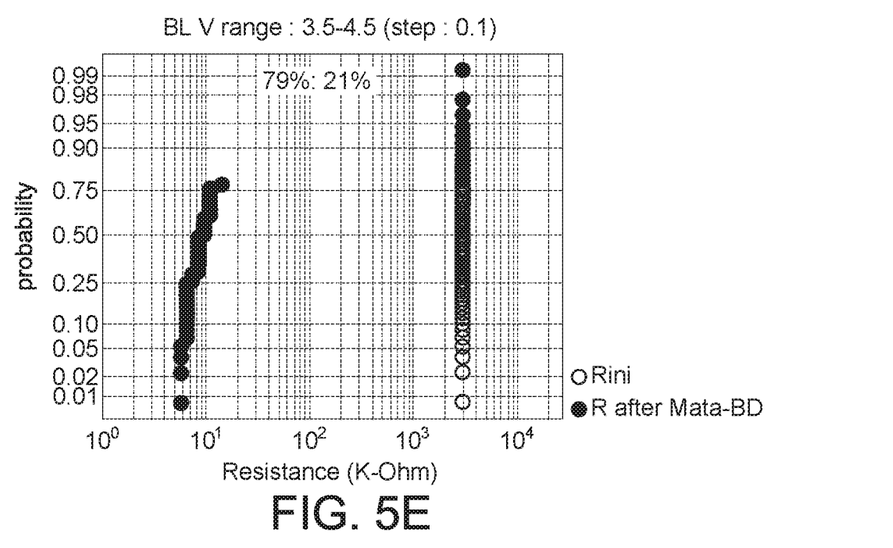
Figure 5F:
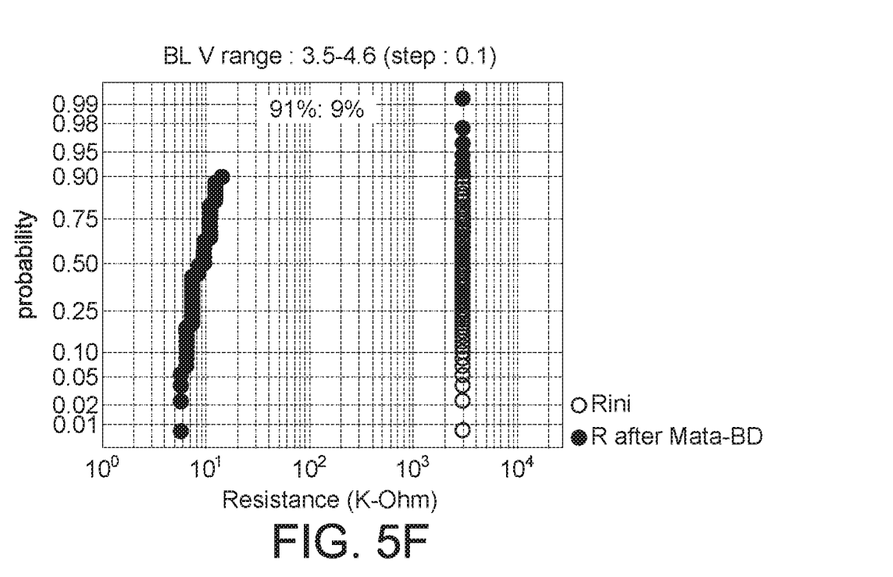
Figure 5G:
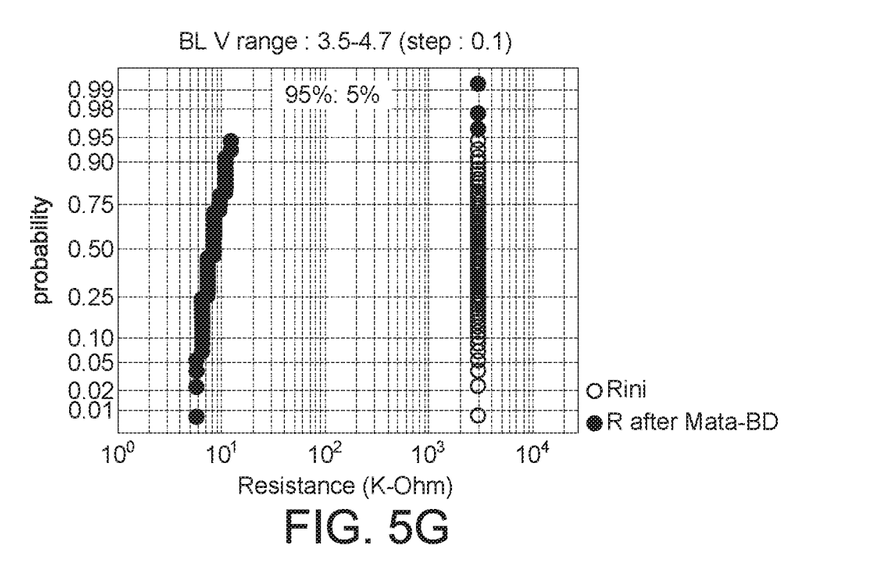
Figure 5H:
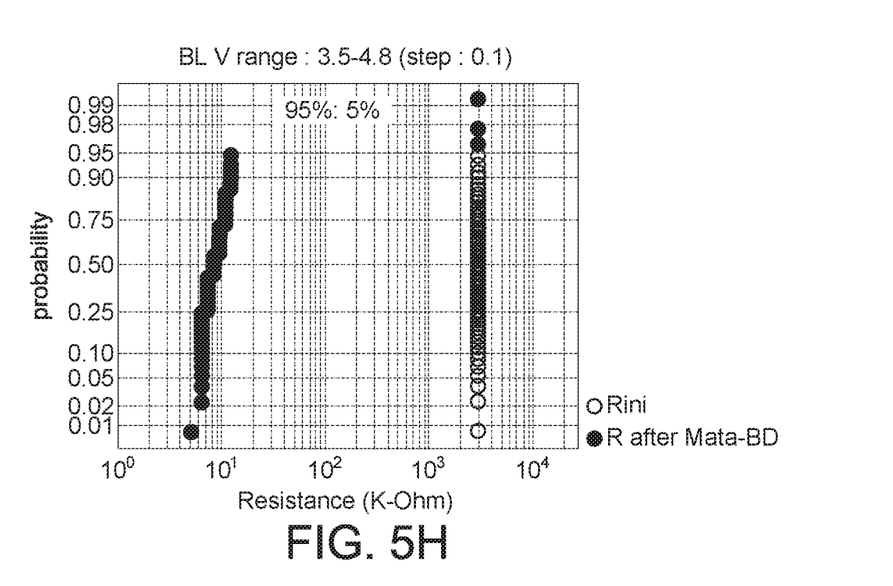

The result of FIG. 5A shows that 6% of the tested transistors are turned on and the related memory units provide digital signal "0" (i.e. 6% of the dielectric layers in the breakdown condition), and 94% of the tested transistors are turned off and the related memory units provide digital signal "1" (i.e. 94% of the dielectric layers in the non-breakdown condition). Similarly, the results of FIG. 5B-FIG. 5H show that 19%, 43%, 70%, 79%, 91%, 95% and 95% of the tested transistors are turned on and the related memory units provide digital signal "0", respectively. According to the results indicated by FIG. 5A-FIG. 5H, the breakdown voltages from 4V to 4.8V (applied to the BL) induce different randomness of digital signal "0" such as varied from 6% to 95% during the power-up state. It is suggested (but not for limiting the present disclosure) that the memory units providing 43% of digital signal "0" and 57% of digital signal "1" as shown in FIG. 5C would be one of good "security fingerprints" for practical applications.

According to the aforementioned description, the memory units of the embodiments utilizes a programmable memory array (ex: such as (but not limited to) MOSFET(1T)-PUF array) with excellent randomness of a combination of the digital signals "0" and "1" achieved after suitable mata-breakdown (BD) condition by using the dielectric layer(s) in contact with the conductive portion(s) such as the contact plugs or the vias. According to the design of the embodiments, the existence of plentiful resistance (R) margin between the digital signal "0" (high-R) and the digital signal "1" (extremely low-R) (i.e. huge difference between the resistances; as shown in FIG. 1C, or FIG. 5A-FIG. 5H) of the turned-on and turn-off transistors of the memory units as described above. Thus, the PUF reliability can be enhanced by using the resistance memory units of the embodiment. Also, the memory units with the dielectric layers according to the embodiment are not sensitive to the environmental noises, and presents good PUF stability during the temperature variation. Accordingly, the reliability and performance of an apparatus can be significantly improved by applying the stable embodied structures of the memory units.

Figure 6:
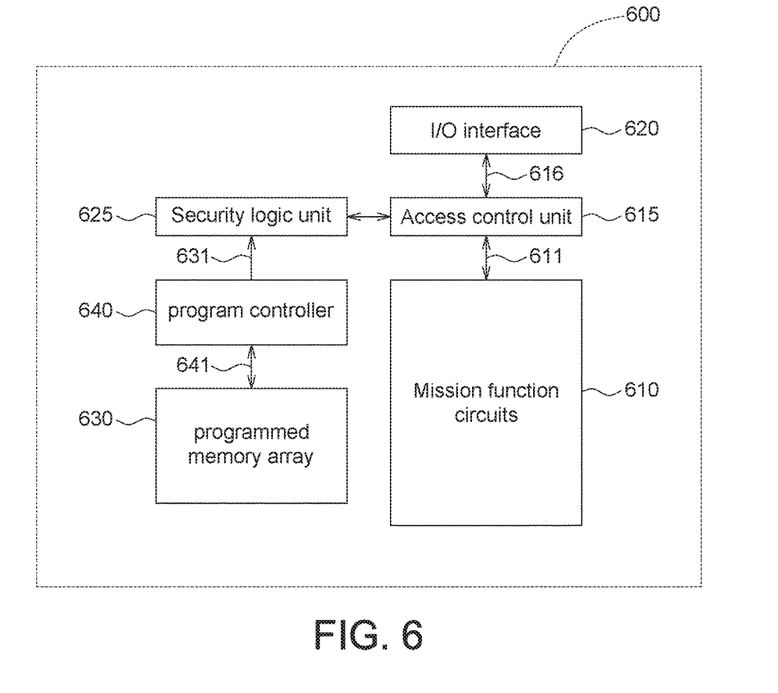
FIG. 6 shows a simplified block diagram of an apparatus with a programmable memory array according to one embodiment in an application.

FIG. 6 shows a simplified block diagram of an apparatus with a programmable memory array according to one embodiment in an application. In this example, an apparatus comprises an integrated circuit 600 having a programmable memory array 630 (such as a PUF programmable memory array 630 comprising a plurality of memory units and a controller (such as a program controller 640) for executing a programming procedure (ex: a PUF procedure) to create one or more data sets in the programmable memory array 630 are provided. One of the data sets (ex: the randomness of the digital signals 0 and 1 is close to 50% and 50%) could be determined as an optimal data sets, which is a "fingerprint" of a chip. According to the embodiment, the programmable memory array 630 creates and store a unique data set, which can be used for example as a unique chip ID, a key for an authentication or encryption protocol, or other type of secret or unique data value.

The integrated circuit 600 includes mission function circuits 610, which can comprise special purpose logic sometimes referred to as application-specific integrated circuit logic, data processor resources such as used in microprocessors and digital signal processors, large-scale memory such as flash memory, DRAM memory, programmable resistance memory and combinations of various types of circuits known as system on a chip configurations. The integrated circuit 600 includes an input/output interface 620, which can comprise wireless or wired ports providing access to other devices or networks. In this simplified illustration, an access control unit 615 is disposed between the input/output interface 620 and the mission function circuits 610. The access control unit 615 is coupled to the input/output interface 620 by the bus 616, and coupled to the mission function circuits 610 by the bus 611. An access control protocol is executed by the access control unit 615 to enable or disable communications between the mission function circuits 610 and the input/output interface 620.

In support of the access control unit 615, a security logic unit 625 is disposed on the chip in this example. The security logic unit 625 is coupled to a programmed memory array 630, and the security logic unit 625 is able to store one unique data set from the one or more data sets after execution of the programming procedure (ex: PUF procedure). The unique data set is accessible on a bus 631 by the security logic unit 625 through a program controller 640 (such as a PUF program controller), and utilized by the security logic unit 625 in communications across the bus 622 with the access control unit 615.

In this example of the apparatus, the program controller 640, implemented for example as a state machine on the integrated circuit with the plurality of programmable resistance memory cells, provides signals to control the application of bias arrangement supply voltages to carry out the programming procedure (ex: PUF procedure) and other operations involved in accessing the programmed memory array 630, for performing PUF and for reading the data set stored in the programmed memory array 630.

Other embodiments with different configurations of known elements in the device/apparatus can be applicable, and the arrangement depends on the actual needs of the practical applications. It is, of course, noted that the configurations of figures are depicted only for demonstration, not for limitation. It is known by people skilled in the art that the shapes or positional relationship of the constituting elements and the procedure details could be adjusted according to the requirements and/or manufacturing steps of the practical applications.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A semiconductor device, comprising:
a programmable memory array comprising plural memory units disposed above a substrate, and each of at least two of the memory units comprising:
a gate electrode, disposed above the substrate;
a source and a drain, disposed in the substrate and positioned correspondingly at two sides of the gate electrode;
a conductive portion, spaced apart from the gate electrode; and
a dielectric layer disposed on at least one of the source and the drain, and the dielectric layer contacting the conductive portion and separated from the gate electrode, and the dielectric layer defining a threshold voltage of the memory unit, wherein a top surface and a bottom surface of the dielectric layer are entirely covered by the conductive portion and the at least one of the source and the drain,
wherein the at least two of the memory units have the dielectric layers with different thicknesses, for inducing different threshold voltages of the at least two of the memory units.

2. The semiconductor device according to claim 1, wherein said each of the at least two of the memory units comprises:
a first contact plug and a second contact plug respectively disposed on the source and the drain,
wherein the conductive portion is one of the first contact plug and the second contact plug.

3. The semiconductor device according to claim 2, wherein in said each of the at least two of the memory units, the conductive portion is disposed on the dielectric layer and directly contacts the dielectric layer, wherein the top surface of the dielectric layer is entirely covered by the one of the first contact plug and the second contact plug, and the bottom surface of the dielectric layer is entirely covered by the at least one of the source and the drain.

4. The semiconductor device according to claim 2, wherein in said each of the at least two of the memory units, the conductive portion of said each of the at least two of the memory units contacts the dielectric layer, and the dielectric layer is directly disposed on the conductive portion, wherein the bottom surface of the dielectric layer is entirely covered by the conductive portion.

5. The semiconductor device according to claim 2, wherein said each of the at least two of the memory units further comprises a via disposed on and connected to one of the first contact plug and the second contact plug, and the dielectric layer is directly disposed on the via.

6. The semiconductor device according to claim 2, wherein in said each of the at least two of the memory units, the dielectric layer is disposed on the source, and the first contact plug directly contacts the dielectric layer; and
said each of the at least two of the memory units further comprises another dielectric layer disposed on the drain, and the second contact plug directly contacts the another dielectric layer,
wherein the dielectric layer completely separates the first contact plug from the source, and the another dielectric layer completely separates the second contact plug from the source and the drain.

7. The semiconductor device according to claim 1, wherein the dielectric layer has a surface roughness larger than 5% of an uniformity equation expressed below:

$$[(MAX-MIN)/(2\times AVG)]\times 100\%$$

wherein "AVG" is an average thickness of q local points sampled on the dielectric layer, "MAX" is a maximum thickness of said q local points, "MIN" is a minimum thickness of said q local points, q≥7 and q is an integer.

8. The semiconductor device according to claim 1, wherein the dielectric layer has a thickness in a range of 1 nm to 5 nm.

9. An apparatus with a semiconductor device, comprising:
a substrate, having a sub-function region and a main function region;
a main function memory array disposed in the main function region; and
a programmable memory array, disposed in the sub-function region and comprising plural memory units, and each of at least two of the memory units comprising:
a gate electrode disposed above the substrate;
a source and a drain, disposed in the substrate and positioned correspondingly at two sides of the gate electrode;
a conductive portion spaced apart from the gate electrode; and
a dielectric layer disposed on at least one of the source and the drain, and the dielectric layer contacting the conductive portion and separated from the gate electrode, and the dielectric layer defining a threshold voltage of the memory units, wherein a top surface and a bottom surface of the dielectric layer are entirely covered by the conductive portion and the at least one of the source and the drain,
wherein the at least two of the memory units have the dielectric layers with different thicknesses, for inducing different threshold voltages of the at least two of the memory units; when a pre-determined voltage is applied to the memory units, a part of the memory units are turned on while other part of the memory units are turned off.

10. The apparatus according to claim 9, wherein said each of the at least two of the memory units further comprises:
a first contact plug and a second contact plug respectively disposed on the source or the drain,
wherein the conductive portion is one of the first contact plug and the second contact plug.

11. The apparatus according to claim 10, wherein in said each of the at least two of the memory units, the conductive portion is disposed on and directly contacts the dielectric layer, wherein the top surface of the dielectric layer is entirely covered by the one of the first contact plug and the second contact plug, and the bottom surface of the dielectric layer is entirely covered by the at least one of the source and the drain.

12. The apparatus according to claim 10, wherein the dielectric layer completely separates the conductive portion from the source or the drain.

13. The apparatus according to claim 10, wherein said each of the at least two of the memory units further comprises a via disposed on and connected to one of the first contact plug and the second contact plug, and the dielectric layer directly contacts one of the via, the first contact plug and the second contact plug.

14. The apparatus according to claim 9, wherein when the pre-determined voltage is applied to the memory units, the dielectric layers of the turned-on memory units are in a breakdown condition while the dielectric layers of the turned-off memory units are in an non-breakdown condition.

15. The apparatus according to claim 9, wherein when the pre-determined voltage is applied to the memory units, the part of turned-on memory units have low resistances less than 10 k ohms (kΩ), and the other part of turned-off memory units have high resistances larger than 100 megohms (MΩ).

16. The apparatus according to claim 9, wherein the dielectric layer has a surface roughness larger than 5% of an uniformity equation expressed below:

$$[(MAX-MIN)/(2\times AVG)]\times 100\%$$

wherein "AVG" is an average thickness of q local points sampled on the dielectric layer, "MAX" is a maximum thickness of said q local points, "MIN" is a minimum thickness of said q local points, $q \geq 7$ and q is an integer.

\* \* \* \* \*